(12) United States Patent
Nysen et al.

(10) Patent No.: US 10,205,234 B2
(45) Date of Patent: Feb. 12, 2019

(54) METHOD FOR OPERATION OF AN ANTENNA SYSTEM ENABLING CONTROL OF RADIATION CHARACTERISTICS

(71) Applicant: NETGEAR, Inc., San Jose, CA (US)

(72) Inventors: Paul A. Nysen, Carlsbad, CA (US); Todd Van Cleave, San Marcos, CA (US)

(73) Assignee: Netgear, Inc., San Jose, CA (US)

( * ) Notice: Subject to any disclaimer, the term of this patent is extended or adjusted under 35 U.S.C. 154(b) by 978 days.

(21) Appl. No.: 14/492,233

(22) Filed: Sep. 22, 2014

(65) Prior Publication Data

US 2015/0042514 A1 Feb. 12, 2015

Related U.S. Application Data

(62) Division of application No. 12/870,378, filed on Aug. 27, 2010, now Pat. No. 8,842,044.

(51) Int. Cl.
*H01Q 3/24* (2006.01)
*H01Q 25/00* (2006.01)
*H04B 1/38* (2015.01)
*H01Q 21/28* (2006.01)
(Continued)

(52) U.S. Cl.
CPC ............ *H01Q 3/247* (2013.01); *H01Q 1/243* (2013.01); *H01Q 21/28* (2013.01); *H01Q 25/00* (2013.01); *H04B 1/3838* (2013.01)

(58) Field of Classification Search
CPC .......... H01Q 1/243; H01Q 1/245; H01Q 3/24; H01Q 3/242; H01Q 3/247; H01Q 21/28; H01Q 25/00; H01Q 9/42; H04B 1/3838
See application file for complete search history.

(56) References Cited

U.S. PATENT DOCUMENTS 3,530,485 A * 9/1970 Radford ................. H01Q 3/242
342/373
4,257,050 A 3/1981 Ploussios
6,005,525 A 12/1999 Kivela
(Continued)

OTHER PUBLICATIONS

Definition for specific absorption rate. (2006). High Definition: A-Z Guide to Personal Technology. Boston, MA: Houghton Mifflin. Retrieved from https://search.credoreference.com/content/entry/hmhighdef/specific_absorption_rate/0.*
(Continued)

*Primary Examiner* — Bernarr E Gregory
*Assistant Examiner* — Fred H Mull
(74) *Attorney, Agent, or Firm* — Boyle Fredrickson, S.C.

(57) ABSTRACT

A method of operating an antenna system for a wireless device is provided for controlling radiation characteristics of the antenna system. The antenna system includes first and second sets of feed points disposed so that first and second radiation pattern are generated by the antenna system when drive currents are provided at the first and second set of feed points, respectively. The second radiation pattern is different from the first radiation pattern. The first and second drive currents are supplied such that a predetermined overall radiation pattern is generated. The predetermined overall radiation pattern is at least in part a combination of the first radiation pattern and the second radiation pattern. The system and method may be directed toward Specific Absorption of Radiation (SAR) mitigation.

22 Claims, 4 Drawing Sheets

(51) Int. Cl.
*H04B 1/3827* (2015.01)
*H01Q 1/24* (2006.01)

(56) References Cited

U.S. PATENT DOCUMENTS

| | | | |
|---|---|---|---|
| 6,031,495 A | 2/2000 | Simmons et al. | |
| 6,043,779 A | 3/2000 | Lalezari et al. | |
| 6,049,705 A * | 4/2000 | Xue | H04B 7/10 |
| | | | 455/277.1 |
| 6,509,882 B2 | 1/2003 | McKivergan | |
| 6,515,627 B2 | 2/2003 | Lopez et al. | |
| 6,515,630 B2 | 2/2003 | Honda | |
| 6,535,170 B2 | 3/2003 | Sawamura et al. | |
| 6,552,689 B2 | 4/2003 | Shinichi | |
| 6,762,724 B2 | 7/2004 | Peng | |
| 6,985,119 B2 | 1/2006 | Forster et al. | |
| 7,528,785 B2 | 5/2009 | Forster et al. | |
| 7,539,458 B2 | 5/2009 | Jafarkhani et al. | |
| 7,541,991 B2 | 6/2009 | Qi et al. | |
| 2005/0075123 A1 | 4/2005 | Jin et al. | 455/522 |
| 2007/0210970 A1 | 9/2007 | Egawa et al. | |
| 2008/0246668 A1 | 10/2008 | Qi et al. | 343/702 |
| 2009/0009407 A1 | 1/2009 | Hong et al. | |
| 2009/0167617 A1 * | 7/2009 | Nishio | H01Q 9/0421 |
| | | | 343/702 |
| 2009/0207092 A1 | 8/2009 | Nysen et al. | 343/876 |
| 2009/0224991 A1 | 9/2009 | Rowson et al. | 343/747 |
| 2010/0053022 A1 | 3/2010 | Mak et al. | 343/893 |
| 2010/0279751 A1 | 11/2010 | Pourseyed et al. | 455/575.7 |
| 2014/0329552 A1 * | 11/2014 | Gopalakrishnan | H01Q 1/243 |
| | | | 455/522 |

OTHER PUBLICATIONS

P. Hallbjorner, Dual feed monopole antenna, IEE Proc.-Microw. Antennas Propag., vol. 150. No. 3, p. 159-163, Jun. 2003 (Year: 2003).*

Y. Rikuta et al., Planar Monopole Antenna with Dual Frequency for UWB System, 2003 IEEE Conference on Ultra Wideband Systems and Technologies, p. 176-179, Nov. 2003 (Year: 2003).*

\* cited by examiner

METHOD FOR OPERATION OF AN ANTENNA SYSTEM ENABLING CONTROL OF RADIATION CHARACTERISTICS

CROSS-REFERENCE TO A RELATED APPLICATION

This application is a divisional of U.S. patent application Ser. No. 12/870,378, filed Aug. 27, 2010, now U.S. Pat. No. 8,842,044, and entitled "Apparatus and Method for Operation of an Antenna System Enabling Control of Radiation Characteristics", the contents of which are hereby incorporated by reference in their entirety.

BACKGROUND OF THE INVENTION

Field of the Invention

The present invention pertains in general to control of electromagnetic radiation emitted from wireless devices caused by an antenna system energization and in particular to an apparatus and methods of operation of an antenna system for controlling radiation emission characteristics of same.

Discussion of the Related Art

The evolution of wireless devices has dramatically increased the availability and adoption of voice and data services. This has created a significant demand for improved wireless devices and in turn has complicated the design considerations for transmitters/receivers and antennas that can be used in wireless devices.

Until the advent of mobile handsets, portable wireless terminals and other wireless devices, antenna design was based often purely on technical radio specifications such as gain, bandwidth, and polarization, for example. Demand for reduced size, increased power efficiency and the requirement to meet ever more stringent regulations that limit emission of and/or exposure to radiation have emphasized a number of additional aspects in the design of antennas for wireless devices. Specifically, antenna efficiency and a reduction of user irradiation by a wireless device have become important design considerations for transmitter stages for use in wireless devices.

When used for transmission purposes, an antenna may emit substantial amounts of electromagnetic radiation. The electromagnetic radiation emitted by the antenna is characterized by electric and magnetic field components, as well as polarizations of the electromagnetic field components. The electromagnetic field forms a radiation pattern depending on distance and/or orientation relative to the antenna. The electromagnetic radiation that is emitted into the environment may interact with other elements including plants, animals, and persons including, for example, users of a wireless device, and may be partially or substantially absorbed by one or more elements. Furthermore, other elements may have an effect on the radiation pattern. Absorption of the radiation by the elements may depend on the composition and shape of each element.

Exposure to electromagnetic radiation may depend on distance and orientation of an element relative to the antenna. For example, for a user of a wireless device, exposure to electromagnetic radiation from a transmitting wireless device may be determined by proximity of the user to the wireless device and the solid angle that a user occupies relative to the wireless device and/or the antenna. Specific absorption of radiation (SAR) is the measure of power absorbed by a volume (typically 1 gm, equivalent to 1 cc) of tissue comprising the body of interest due to incident RF radiation upon that volume within the tissue. Specific use scenarios of a wireless device by a user may result in different SAR levels in different regions of the user's body. For safety reasons, SAR limits for different regions of the body are prescribed in many jurisdictions.

Wireless devices are subject to SAR limits in many countries to ensure that device users are not exposed to unacceptable irradiation levels. Regulations may prescribe different SAR exposure limits for different regions of the body. SAR is determined by the radiation absorbed by a person and is typically defined in terms of power absorbed per mass of tissue. SAR can depend on a number of aspects including, for example, the position and orientation of the wireless device relative to the person, the field emission characteristics of the wireless device, the transmitting power and frequency, the polarization of the radiation, as well as ambient elements which may interact with the radiation emitted by the wireless device.

As the operating frequencies for wireless devices are usually fixed and cannot be independently controlled, known solutions to limit SAR build upon control of one or more of the other aspects. Although, depending on the wireless communication protocol, transmission power, and consequently user irradiation, may be reduced in close proximity to wireless base stations, means are required to limit SAR even at full transmission power of a transmitter. Designing wireless devices with good transmitter performance and sufficiently low SAR has become increasingly challenging.

Known solutions for limiting SAR include intermittent transmission thereby reducing time averaged data transmission rate, removing the device or at least the transmitter from the user, reducing transmission power with decreasing distance from a base station, controlling the near-field radiation emission characteristics, as well as configuring an antenna system so that it emits radiation primarily in predetermined directions away from a user. Known solutions, however, require sophisticated antenna designs and/or mechanisms to control the operation of an antenna in a wireless device, which in turn may require wireless devices with complex hardware and/or software.

A solution that seeks to control radiation emission characteristics includes United States Patent Application Publication No. 2007/0210970, which relates to a system for reducing local SAR by suppressing concentration of the current flowing through an antenna element provided through two or more feed points. Furthermore, United States Patent Application Publication No. 2009/0009407 discloses generating resonance in a multi-band antenna having at least two feeding ports, to improve mute performance, reduce SAR, and prevent reduction in call performance caused by a user's body and hand. In addition, U.S. Pat. Nos. 6,762,724, 6,552,689, 6,509,882 and 6,031,495 relate in general to wireless communication devices with reduced SAR. However, current solutions for controlling SAR can be ineffective in meeting regulatory requirements. Therefore there is a need for a new method and apparatus for controlling radiation characteristics of an antenna that overcomes one or more of the problems in the art.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide an antenna and method for operation of same for controlling radiation characteristics.

In accordance with an aspect of the present invention, there is provided an antenna system for a wireless device, the antenna system having: a first set of one or more feed points, the first set of one or more feed points disposed so that a first radiation pattern is being generated when a first set of drive currents is provided to the antenna system at the first set of one or more feed points; and a second set of one or more feed points, the second set of one or more feed points disposed so that a second radiation pattern is being generated when a second set of drive currents is provided to the antenna system at the second set of one or more feed points, wherein the second radiation pattern is at least in part different from the first radiation pattern, and wherein controlling supply of the first set, of one or more drive currents and the second set of one or more drive currents results in an overall radiation pattern being generated, the overall radiation pattern being at least in part a combination of the first radiation pattern and the second radiation pattern.

In accordance with another aspect of the present invention, there is provided a wireless device including an antenna system having: a first set of one or more feed points, the first set of one or more feed points disposed so that a first radiation pattern is generated by the antenna system when a first set of drive currents is provided to the antenna system at the first set of one or more feed points; and a second set of one or more feed points, the second set of one or more feed points disposed so that a second radiation pattern is generated by the antenna system when a second set of drive currents is provided to the antenna system at the second set of one or more feed points, wherein the second radiation pattern is at least in part different from the first radiation pattern, and wherein controlling supply of the first set of one or more drive currents and the second set of one or more drive currents results in an overall radiation pattern being generated, the overall radiation pattern being at least in part a combination of the first radiation pattern and the second radiation pattern.

In accordance with another aspect of the present invention, there is provided a method for providing drive current to an antenna system for a wireless device, the antenna system having a first set of feed points disposed so that a first radiation pattern is generated corresponding to a first set of drive currents provided to the antenna system at the first set of feed points; and a second set of feed points disposed so that a second radiation pattern is generated corresponding to a second set of drive currents provided to the antenna system at the second set of feed points; wherein the second radiation pattern is at least in part different from the first radiation pattern; the method comprising: (a) providing the first set of drive currents for a first predetermined time; (b) providing the second set of drive currents for a second predetermined time; repeating steps (a) and (b) until occurrence of a predetermined event, whereby an overall radiation pattern is being generated, the overall radiation pattern being at least in part a combination of the first radiation pattern and the second radiation pattern.

DETAILED DESCRIPTION OF THE PREFERRED EMBODIMENTS

Figure 1:
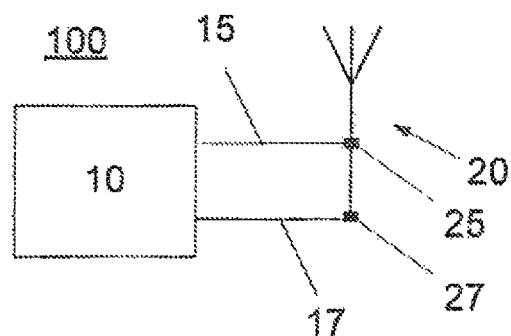
FIG. 1 illustrates a block diagram of an apparatus according to embodiments of the present invention.

The term "peripheral device" is used herein to refer to an apparatus configured for detachable operative interconnection with a computing device. A peripheral device may be configured to enable computing devices such as personal, notebook and mobile computers, handheld communication devices and so forth, to provide additional, complementary or redundant functionality. A peripheral device may be configured as a wireless communication device, for example a wireless network interface adapter or other device as would be readily understood by a worker skilled in the art. A peripheral device may be detachably operatively connected with a computing device via a predetermined interconnect system, for example, a USB™, Firewire™, ExpressCard™, or other interface configuration.

The term "hotspot" is used herein to refer to one or more spatially confined regions of increased intensity in a radiation emission pattern of an antenna. Hotspots may be of interest due to their role in irradiation of the near surface region of a body of interest where SAR is measured. A "hotspot" may be understood as generated by a radiating source in either a far-field or near-field situation irradiating a body of interest. In the context of SAR, as substantially referred to here, the "hotspot" is created within an external body of interest, such as human tissue, and is typically proximate the surface of said body. A hotspot will typically occur proximate to an antenna and indicates a peak in intensity of the radiation pattern that is generated when a drive current is provided to an antenna. The radiation emission pattern of an antenna may be characterized by one or more hotspots. The form/shape and strength of a hotspot can depend on the drive current and the feed point of the antenna. Different hotspots may occur in response to driving an antenna from different feed points.

As used herein, the term "about" refers to a ±10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

The present invention provides a method and apparatus for controlling emission patterns of an antenna system as expressed in the near surface region of a body of interest. In some embodiments, the apparatus includes an antenna having two or more feed points, such that when a current is provided at each of the feed points, the antenna has a desired functionality while generating a particular radiation pattern. By varying which feed point or feed points current is applied to, and/or by varying the intensity of currents applied to different feedpoints, the antenna radiation pattern may be varied. Therefore, by controlling the application of current to the two or more feed points, adjustment of the resulting overall radiation pattern is enabled while providing desired antenna functionality. In this manner, a radiation hotspot may be moved by current application to another feed point on the antenna, thereby enabling the management of SAR while providing desired antenna functionality.

In some embodiments, the antenna system comprises multiple antennas, at least one of which has two or more feed points to which current may be applied so as to adjust the radiation patterns of one or more antennas individually, so as to adjust the radiation pattern of the system of multiple antennas, or both. Currents may be applied at zero, one, or multiple feed points of each of the multiple antennas so as to controllably adjust the radiation pattern of the system of antennas, while driving sufficient feed points so as to provide desired antenna system functionality. The radiation pattern of the system of antennas may be adjusted between two or more radiation patterns by driving of different feed points, the two or more radiation patterns combined into an overall radiation pattern. In some embodiments, different feed points are driven during different time intervals, and the relative lengths of the different time intervals varied to vary the overall radiation pattern. In some embodiments, different feed points are driven concurrently, and the relative power applied to each feed point is varied to vary the overall radiation pattern. A combination of driving different feed points at different overlapping or non-overlapping time intervals, and driving different feed points with different relative powers may also be performed in some embodiments.

In some embodiments, the antenna system comprises multiple antenna components and multiple feed points. The antenna system may be selectably configured so as to drive one or more sets of antenna elements via one or more feed points. Each set of one or more antenna elements, driven by a set of one or more feed points, may correspond to a currently activated antenna of the antenna system. By changing the sets of antenna elements being driven, and/or changing the feed points, the antenna system may be configured to realize different configurations of one or more actively operating antennas, each configuration corresponding to a different radiation pattern. Thus, the antenna system may comprise a set of antenna elements and a set of feed points, the set of antenna elements and feed points selectably configurable into one or more different sets of activated antennas and hence different radiation patterns. A desired overall radiation pattern may be produced as a combination of the different radiation patterns.

For example, embodiments of the present invention may comprise a network of antenna elements and feed points, along with a set of switches, such as MEMS switches, transistor switches, or the like. The switches may be set in different arrangements so as to realize one of several electrical arrangements, each corresponding to a different set of actively operating antennas. Actively operating antennas and possibly antenna elements currently not corresponding to an actively operating antenna may interact to produce a radiation pattern at a given time. Switching of the antenna system configuration over time may be performed to produce an overall radiation pattern over time, for example measured as a time-averaged radiation pattern, cumulative radiation pattern, time-varying radiation pattern, or the like. In some embodiments, plural antenna configurations are operated concurrently, for example by driving different feed points concurrently. The overall radiation pattern may then substantially correspond, at least in part, to a superposition of concurrent radiation patterns.

According to an aspect of the present invention, there is provided an antenna system for a wireless device and a method for operating the antenna system for controlling the radiation pattern of the antenna system and/or SAR caused thereby. The antenna system may be configured with two or more feed points wherein each feed point can be used to provide drive current to the antenna system. Drive currents may be controllably provided to the antenna system via at least one of the two or more feed points, thereby controllably exciting the antenna system so as to control the radiation pattern thereof. For example, different radiation patterns may correspond to different spatial patterns of hotspots. In some embodiments, hotspots corresponding to different radiation patterns may be non-overlapping or spatially disjoint.

In some embodiments, at least one antenna of the antenna system may be configured to generate a first radiation pattern when a first drive current is provided to the antenna at a first feed point, and further to generate a second radiation pattern when a second drive current is provided to the antenna at a second feed point. The first feed point and the second feed point are disposed and the antenna is configured so that the second radiation pattern is at least in part different from the first radiation pattern.

In some embodiments, plural antennas may be driven at controllably selected feed points of the antenna system so as to produce different radiation patterns. The radiation pattern of a plural antenna system may depend on an interaction between radiation patterns of the individual antennas, as would be readily understood by a worker skilled in the art. In some embodiments, the radiation patterns are varied over time by driving the antenna system at different combinations of feed points, thereby providing an overall radiation pattern which is a combination of the different radiation patterns.

In some embodiments, plural feed points of an antenna system may be driven separately and in sequence, for example by driving a first feed point during a first time interval and driving a second feed point during a second, separate time interval, thereby resulting in different radiation patterns of the antenna system during the first and second time intervals, respectively.

In some embodiments, plural sets of feed points of an antenna system may be driven separately and in sequence, for example by plural sets of drive currents applied thereto. Each of the plural sets may be disjoint or overlapping. For example, for an antenna system having feed points 1, 2, . . . 10, at least the following sets of three feed points each may be defined and utilized: (1, 2, 3), (2, 3, 4), . . . (8, 9, 10), (9, 10, 1), and (10, 1, 2). At least two of the aforementioned sets of feed points may be driven during different time intervals, the time intervals being of equal or non-equal length.

In some embodiments, plural sets of feed points may be driven substantially concurrently by plural sets of drive currents using a complex summing network, which provides for a predetermined vector combination of magnitude and phase corresponding to excitation for each set of feed points.

Plural sets of drive currents having differing phases and magnitudes may be combined in different ways. For example, the sum of two or more sinusoidal drive currents having the same frequency may be represented using phasor addition, wherein each drive current is represented by a vector having length equal to the drive current amplitude and making an angle, relative to a predetermined reference vector, equal to the drive current phase, as would be readily understood by a worker skilled in the art. Superposition of plural drive currents corresponds to vector addition of their corresponding phasors, which may be computed using polar or rectangular coordinates. The sum of drive currents, each having more than one frequency, may be similarly represented, for example by performing phasor addition on corresponding spectral components of the drive currents.

In some embodiments, plural drive currents are generated using plural current sources, each of the plural drive currents being applied to one or more drive points or feed points of an antenna system provided in accordance with the present invention.

In some embodiments, plural drive currents are generated by feeding one current source into a transmission line and drawing drive currents from different points along the transmission line. For example, this approach may be used to obtain plural versions of a drive current, each version having a different phase.

In some embodiments, each of a plurality of drive currents, for example each having at least a different phase, is applied to a different feed point of an antenna system provided in accordance with the present invention. In some embodiments, switches such as MEMS switches or transistors are used to selectably apply drive currents to feed points. In some embodiments, each of a plurality of drive currents is substantially permanently or non-selectably associated with a predetermined feed point of an antenna system.

In one embodiment, a current combining system comprises hybrid couplers, the current combining system having two inputs and two outputs. Two different drive currents may be applied at the inputs, for example having substantially the same frequency but different amplitudes and phases, measured over a predetermined time interval for example. The first output may produce a current corresponding to the sum of the input drive currents, while the second output may produce a current corresponding to the sum of one input drive current with a phase inverted version of the other. If the two input drive currents are in phase or 180 degrees out of phase, one output current is zero and the other output current has an amplitude corresponding to the sum of the input current amplitudes. This current combining system can be used as a source of two complimentary drive currents. The phase relationship of the two input currents may be varied in order to control the output drive currents.

In some embodiments, the first radiation pattern and the second radiation pattern may be provided substantially concurrently or at least in overlapping time intervals, due to application of the first and second sets of drive currents during corresponding concurrent or overlapping time intervals.

FIG. 1 illustrates a block diagram of an apparatus 100 according to embodiments of the present invention. The apparatus comprises a drive current system 10 operatively coupled to an antenna system 20 via two drive lines 15 and 17. The drive line 15 is operatively, connected to the antenna system via feed point 25 and the drive line 17 is operatively connected to the antenna system via feed point 27. According to embodiments of the present invention, the drive current system 10 selectively provides a first drive current and a second drive current via respective drive lines 15, 17 and feed points 25, 27 to the antenna system 20. Depending on the embodiment, two or more drive lines and associated feed points for operatively coupling the drive current system and the antenna system may be provided.

According to embodiments of the present invention, the operative coupling between the drive current system 10 and the antenna system 20 may be configured to provide predetermined impedance matching. The impedance matching may depend on whether a first, second or both drive currents are provided to the antenna system 20. For example, depending on the embodiment, the impedance matching may be the same or different for different drive lines, or it may depend on the configuration of the switching system.

According to an aspect of the present invention, control of the supply of the first drive current and the second drive current results in the generation of a predetermined overall radiation pattern, which is at least in part a combination of the first radiation pattern and the second radiation pattern. For example, the overall radiation pattern may be characterized at least in part by a time-averaged radiation pattern, a superposition of radiation patterns, or the like, or a combination thereof. It is noted that the overall radiation pattern may refer to the radiation pattern of the antenna system or the radiation pattern generated by the antenna system in combination with other elements, for example, the combination of the antenna system and one or more components of a wireless device. Accordingly, depending on the embodiment, the overall radiation pattern may also refer to the radiation pattern generated by a wireless device including the antenna system.

According to embodiments of the present invention SAR may depend on various aspects including the application of an apparatus as well as the use of the apparatus by a user. For example, an apparatus according to some embodiments of the present invention may be configured for use in a wireless peripheral modem for interconnection with a computing device. According to some other embodiments, the apparatus may be configured for use in a cellular phone. Each use and/or application may be characterized by a number of aspects including proximity of the apparatus to different parts of a user's body or other elements, and/or typical durations of use or other aspects. The type of application as well as aspects of use may be referred to as predetermined use conditions. Accordingly, the same apparatus may expose a user to a first SAR, under first use conditions, while the user may be exposed to a second SAR under second use conditions.

A predetermined use condition may be further characterized by distance and/or relative orientation between the user or portions of the user and the apparatus or the wireless device the apparatus is associated with. Accordingly, during a predetermined use conditions, a user may be subject to exposure to the first SAR in a first portion of the body and to exposure to the second SAR in a second portion of the body. According to some embodiments of the present invention, the first portion of the user's body may be different in at least some part from the second portion of the user's body.

According to embodiments of the present invention, the selective provision of the two or more drive currents to the antenna at corresponding two or more feed points can result in two or more radiation patterns wherein each radiation pattern can comprise one or more hotspots substantially different from the one or more hotspots associated with the other radiation patterns, Each radiation pattern may correspond to different SAR patterns in at least partially different portions of a user's body, Accordingly, the overall SAR over the total of the exposed portions of a user's body may be substantially different from the mere sum of the individual SARs, Accordingly, apparatus according to embodiments of the present invention may provide an overall SAR that is lower than the sum of the two or more individual SARs. in general, in some embodiments, the SAR decrease may approach 1/N, when compared with the SAR produced by a single radiating antenna, due to the averaging of N multisource radiators. For example, this may be the case if N different antenna system configurations are implemented sequentially, each for about the same amount of time, wherein SAR effects due to each of the N configurations are concentrated in a different spatial region.

In some embodiments, the present invention may facilitate a decrease in measured SAR by changing the location of irradiation hotspots affecting recipient tissue over time. For example, an antenna system may be provided which can be driven in N different configurations, each configuration resulting in a different pattern of hotspots. By switching between configurations, time-averaged or cumulative irradiation for a local area of exposed tissue due to hotspots may be decreased, thereby reducing measured SAR for at least some SAR measurement methods.

As an illustrative example, consider an embodiment wherein the antenna system may be driven at N different feed point sets to provide N different radiation patterns, no two of which have overlapping hotspots, and wherein no single area of tissue is irradiated by hotspots corresponding to two different patterns. Furthermore, assume that power absorbed by an area of tissue due to each hotspot has nominal value x, and that power absorbed by an area of tissue due to non-hotspot radiation has nominal value rx, with r<1. Furthermore, assume that each of the N different antenna configurations is implemented for an equal amount of time. In such an embodiment, time-averaged power absorbed at a given area of tissue is expected to not exceed about x/N+rx(N−1)/N. For small r, this approaches x/N. For comparison, for the same antenna system operating without switching between antenna configurations, time-averaged power absorbed at a given area of tissue, irradiated due to a hotspot, would be about x.

In other embodiments, some antenna configurations may be used for more time than others. This may facilitate further control of time-averaged radiation patterns of the antenna system.

In some embodiments, the present invention may be configured for avoiding or mitigating potential negative effects due to continuous long-term irradiation of tissue by a hotspot. For example, by varying the antenna system feed points to which currents are applied over time, hotspot locations may be varied over time. Certain areas of tissue may thus be irradiated periodically and/or intermittently by a hotspot, but not continuously. For example, this may allow tissue to "recover" from intermittent high irradiation events by diffusing thermal energy.

An apparatus according to an embodiment of the present invention may be employed in a number of wireless devices including modems, smart phones, mobile phones or other wireless devices that may be integrated with or peripheral to computing devices, for example. An antenna or antenna system according to some embodiments of the present invention may be configured to provide N feed points wherein N can be two, three or more. According to some embodiments of the present invention selectively providing drive current to each of N feed points of an antenna or antenna system for a predetermined time during transmission may be employed to reduce exposure of a user in proximity of the antenna or antenna system to substantially only about an $N^{th}$ fraction of the SAR that the user would be exposed to, if the same drive current was continuously provided to only one of the feed points.

Antenna

An antenna system according to embodiments of the present invention may be configured in a number of different ways, for example, so as to comprise one or more antennas such as a monopole, dipole or other antenna, an inverted F antenna, a planar inverted F antenna (PIFA), a fractal antenna, patch, slot, aperture, spiral or loop antenna, or other antenna used in wireless devices, folded dipole or multipole, directional or self-similar antenna, or other antenna.

An antenna system according to embodiments of the present invention includes two or more feed points at which current can be supplied to the antenna system for activation thereof. Upon provision of current to a particular feed point, the activation of the antenna system results in a particular radiation pattern being created.

According to an aspect of the present invention, the number of feed points associated with an antenna system can be dependent on the configuration of the antenna system itself, as well as the desired functionality of the antenna system. For example, a minimum predetermined functionality may be desired that is independent of the feed point being used, and as such may at least in part be a factor for determining the number of feed points for the antenna system.

An antenna system according to an embodiment of the present invention may be configured such that each of the first radiation pattern and the second radiation pattern provides one or more predetermined near-field radiation characteristics. For example, the near-field radiation characteristics may include electrical and/or magnetic field strength, and/or polarization at predetermined locations relative to the antenna system and/or in predetermined directions at corresponding locations. According to some embodiments of the present invention, first and second radiation characteristics may be determined by the disposition of the first and second feed points and/or controlled by the magnitude of the first and/or second drive current. It is noted that, depending on the embodiment, an antenna system may provide more than two feed points and may accordingly be driven by more than two or a corresponding number of drive currents, for example.

According to embodiments of the present invention, each of the first and second radiation patterns is dependent on the overall shape and configuration of the antenna system, as well as at least in part based on the disposition of the first and second feed points associated with the antenna system. According to an embodiment of the present invention, the first radiation pattern is, in addition to the corresponding drive currents, substantially determined by the disposition of the first feed point when the first drive current is provided to the antenna system and the second radiation pattern is substantially determined by the disposition of the second feed point when the second drive current is provided.

According to an embodiment of the present invention, the first radiation pattern and the second radiation pattern are furthermore determined by other aspects of the antenna system or aspects of a combination of the antenna system and components of the wireless device with which it is associated. Such aspects may include geometrical configuration of the antenna system and/or the components of the wireless device, the composition of the antenna system and/or the components of the wireless device, as well as aspects such as distance and orientation between the antenna system and/or the wireless device and a user, for example.

According to some embodiments of the present invention, each of the first and second radiation patterns may provide one or more maxima of the corresponding electrical and/or magnetic field strengths at corresponding one or more predetermined locations proximate the antenna system when a first or second drive current is provided to the antenna system. According to an embodiment of the present invention, the one or more maxima and/or predetermined locations may depend on the magnitude of the corresponding drive current.

According to an embodiment of the present invention, the first radiation pattern provides a first maximum electrical and/or magnetic field strength at a first location proximate the antenna system and the second radiation pattern provides a second maximum electrical and/or magnetic field strength at a second location. According to embodiments of the present invention, the first location is different from the second location. According to an embodiment of the present invention, the first maximum is distinctly differently located from the second maximum electrical and/or magnetic field strength.

Method of Operation of the Antenna and Drive Current System

According to embodiments of the present invention, an antenna system with two or more feed points may be selectively provided with drive current via one or more feed points from a corresponding number of drive lines. According to some embodiments, drive current may be supplied to only one feed point at a time. According to other embodiments, drive current may be supplied to two or more feed points at a time.

According to an embodiment of the present invention, a transmission range may depend on the manner in which the antenna system is driven. For example, according to an embodiment of the present invention, driving the antenna system via a first feed point may provide a first transmission range, while driving the antenna system via a second feed point may provide a second transmission range and so forth. According to an embodiment of the present invention, provision of drive current to one or more feed points of the antenna system may be selected based on the communication ranges associated with each of two or more feed points. According to some embodiments, provision of drive current may be configured so as to satisfy communication requirements, such as communication range, radiation pattern, polarization, transmit diversity requirements, and the like, while also satisfying instantaneous and/or average SAR regulatory requirements.

According to an embodiment of the present invention an antenna system may be driven from two or more feed points simultaneously. Simultaneously provided drive currents may be determined in a number of ways, for example, with dependent or independent amplitudes and/or phases. Amplitudes and/or phases of two or more simultaneously provided drive currents may be determined in accordance with one or more predetermined schemes.

According to an embodiment of the present invention, the antenna system may be operated by selectively providing one or more of the drive currents in accordance with a predetermined method during use of the antenna for transmission. An apparatus according to an embodiment of the present invention may be configured to provide drive current via one or more drive lines at a time. For example, the drive current system may be configured to generate and/or provide only one drive current via one drive line at a time.

According to an embodiment of the present invention, the first and second drive current may be provided to an antenna system by switching drive current between the drive lines 15 and 17, for example, as illustrated in FIG. 1. According to an embodiment of the present invention, switching of the drive current between the two or more feed points or selective provision of the drive currents to the two or more feed points may be performed by the drive current system 10. According to another embodiment of the present invention, the drive current system may comprise two or more drive current generation systems for generating the two or more drive currents. Each drive current generation system of the drive current system may be equal or similar to, or dissimilar from the other drive current generation systems.

According to an embodiment of the present invention, the drive current system may be configured to selectively provide two or more drive currents to corresponding drive lines in a number of ways, for example, by selectively generating the two or more drive currents, or by selectively switching one drive current between two or more drive lines, or in other ways. Accordingly, the drive current system may comprise one or more drive current generation systems for generating the two or more drive currents and/or a switching system for switching the one drive current between the two or more drive lines. The switching system may comprise one or more electronic switches, for example, transistor switches, and/or micro-electromechanical systems (MEMS) for switching drive current or other switches. The drive current system may comprise a control system operatively coupled to the switching system for controlling the switching system. The drive current system is operatively coupled to a power supply system for receiving power. The power supply system may be configured as or comprise one or more types of power converters, for example, a fly back, buck or other converter.

According to an embodiment of the present invention, the control system may be configured to include a baseband controller or other controller, for encoding and/or decoding and for processing predetermined types of signals, which may include transmission signals for carrying information for wireless transmission via the antenna for other wireless devices. A drive current system according to embodiments of the present invention may generate the two or more drive currents based on predetermined control signals received from the control system.

While the selective provision of drive current via one or more drive lines to the antenna may be determined based on a predetermined method, the transmission signals in an apparatus according to embodiments of the present invention may be encoded in a number of ways depending on the embodiment. For example, transmission signals may be encoded in one or a combination of a phase shift, frequency keying, frequency and/or amplitude modulation or other scheme depending on the wireless network the apparatus is intended to be used with. Wireless networks may include wireless LAN, WiMAX, Global System for Mobile Communication (GSM), Universal Mobile Telecommunications System (UMTS), Code Division Multiple Access (CDMA), International Mobile Telecommunications-2000 (IMT-2000), better known as 3G or 3rd Generation networks or other networks, for example.

A drive current system according to an embodiment of the present invention may further comprise one or more microprocessors or microcontrollers, software, firmware, memory, digital-to-analog and/or analog-to-digital converters for providing and performing predetermined control functions. According to an embodiment of the present invention, the drive current system may be configured accept input of control parameters and to provide control of the one or more drive currents based on the control parameters. For example, the control parameters may include or be based on a maximum SAR, association of a wireless device including an apparatus according to the present invention with a wireless network and/or location of the wireless device within the network, distance between the antenna system, the apparatus and/or the wireless device and a user and/or other parameters.

An apparatus according to an embodiment of the present invention may further comprise one or more sensors operatively coupled with the drive current system for determining proximity of the apparatus to a user and/or for determining the position and/or orientation of the apparatus, for example a proximity sensor. An apparatus according to the present invention may further comprise or be operatively associated with a global positioning system for determining or inferring coordinates of the apparatus or with an accelerometer sensor system for inferring or determining the orientation of the apparatus. Signals from the sensors may be used at least in part to influence operation of the drive current system, for example to select sets of drive currents provided to the antenna system, intensity of drive currents, and the like. In this manner, the overall radiation pattern of the antenna system may be adjusted based on apparatus orientation or position, for example relative to a user. This approach may be used to actively reduce irradiation of a user in a detected location.

According to an embodiment of the present invention, the selective provision or the switching of the drive current may be performed in accordance with the predetermined method. For example, the drive current may be switched periodically, intermittently, randomly, or in correspondence with one or more predetermined events or a predetermined switching sequence. According to some embodiments of the present invention, predetermined events may include one or a combination of two or more of activation of an outgoing transmission, completion of transmission of a predetermined number of voice and/or data packets, expiry of a predetermined amount of time since a last switch, provision of a predetermined amount of respective first or second drive current since a last switch, radiation of a predetermined amount of energy due to a respective first or second drive current since a last switch, and/or occurrence of one or more predetermined sensor readings, or occurrence of other events, for example.

The invention will now be described with reference to a specific example. It will be understood that the example is intended to describe aspects of some embodiments of the invention and is not intended to limit the invention in any way.

EXAMPLES

Figure 2:
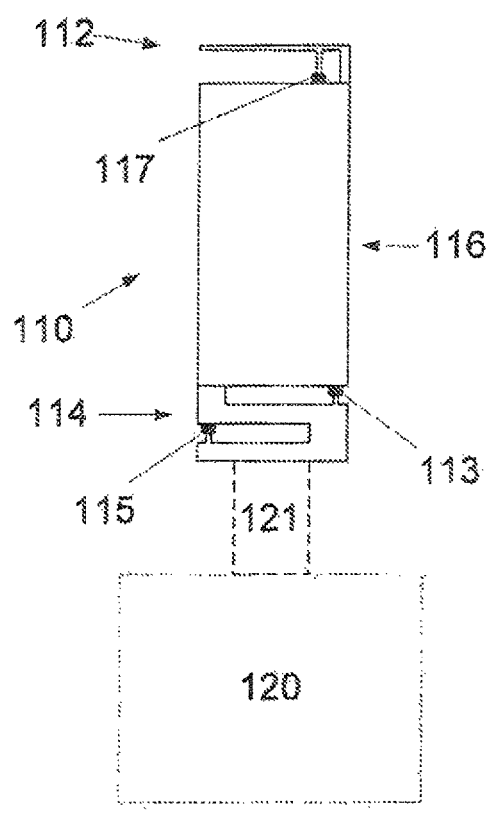
FIG. 2 illustrates a schematic view of an antenna system according to an embodiment of the present invention.

FIG. 2 illustrates a schematic view of an example computer peripheral device with an antenna system 110 according to an embodiment of the present invention. The antenna system 110 may be configured in a number of different ways, for example, as a monopole antenna, an inverted F antenna, a planar inverted F antenna or another antenna. The computer peripheral modem is connected to a host computing device 120 via a predetermined interface 121, for example, via a Universal Serial Bus (USB™), ExpressCard™, PCM-CIA™, or another interface. The antenna system 110 comprises a main section 116, a reciprocal feed section 114, and a distinctly separate PIFA section 112. The reciprocal feed section 114 comprises two feed points 113 and 115. The PIFA section 112 comprises a feed point 117.

Figure 3:
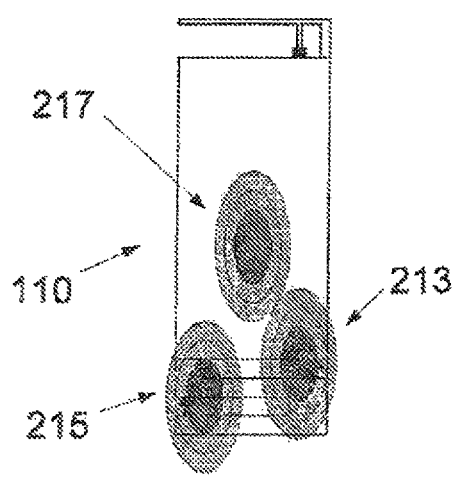
FIG. 3 illustrates a schematic view of the antenna system of FIG. 2 including indications of hot spots of radiation patterns of the antenna according to an embodiment of the present invention.

FIG. 3 illustrates a schematic view of the antenna system 110 of FIG. 2. FIG. 3 illustrates hotspots 213, 215 and 217. Each of the hotspots 213, 215 and 217 indicates a peak in intensity of the radiation pattern that is generated when a drive current is provided selectively to one of the feed points 113, 115 and 117 of the antenna system 110. Hotspot 213 refers to a peak in the radiation pattern generated when the antenna system 110 is provided with drive current at feed point 113, hotspot 215 refers to a peak in the radiation pattern generated when the antenna system 110 is provided with drive current at feed point 115, and hotspot 217 refers to a peak in the radiation pattern generated when the antenna system 110 is provided with drive current at feed point 117. Each hotspot 213, 215 and 217 of the corresponding radiation pattern includes a profile of substantially constant intensity of the corresponding radiation pattern and schematically illustrates a drop of the intensity over three substantially predetermined magnitudes of intensity as illustrated by the concentric shapes associated with each hotspot, wherein each of the hotspots 213, 215 and 217 refers to a peak in intensity substantially centered inside the corresponding hotspot. The example antenna system 110 is configured so that each peak is disposed at a substantially distinct location different from the centers of the other two hotspots. However, in some embodiments, different hotspots may at least in part overlap.

The example computer peripheral device includes a drive current system (not shown) operatively coupled to the antenna system 110. The drive current system may be configured to provide drive current to each of the three feed points 113, 115, and 117 during transmission. The drive current system may be configured to generate one, two or three drive currents for provision to the each of the corresponding three feed points 113, 115, and 117.

Figure 4:
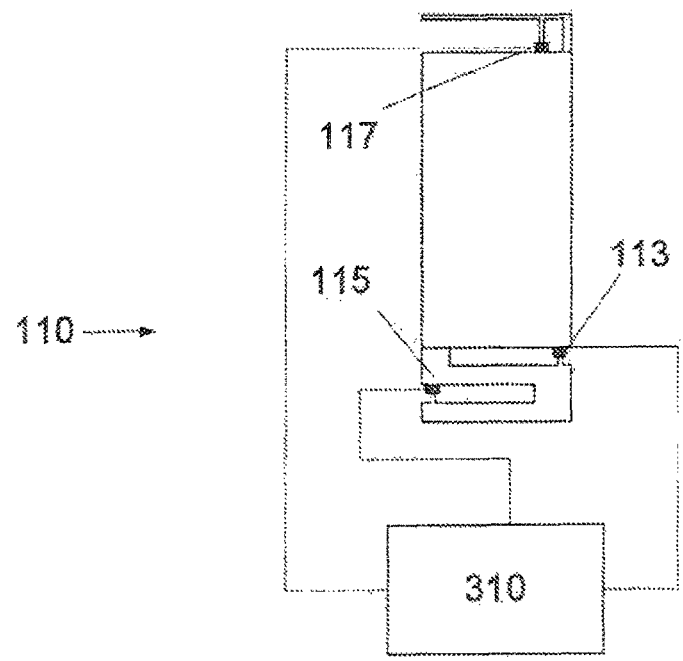
FIG. 4 illustrates a schematic view of the antenna system of FIG. 2 connected to a drive current system according to an embodiment of the present invention.

FIG. 4 illustrates schematically an example drive current system 310 operatively connected to the antenna system 110. The drive current system 310 is configured to generate three drive currents and provide them via drive lines 313, 315 and 317, respectively. The drive current system may be configured with three independent drive current generation systems for generating the three drive currents. The drive current system is configured to selectively activate one of the three drive current generation systems at a time which in turn provides drive current via a corresponding drive line through one of the feed points 113, 115, or 117 to the antenna system 110.

The activation and provision of drive current through one of the feed points 113, 115, or 117 to the antenna system 110 remains active for a first period of time before the active drive current generation system is disabled and one of the other two remaining drive current generation systems is activated to provide drive current via another drive line to the antenna system 110 for a second period of time when the active drive current generation system is disabled and the remaining drive current generation system is activated to provide drive current via the last drive line to the antenna system 110 for a third period of time. The drive current system 310 is configured to cyclically and repeatedly activate all three drive current generation systems during transmission to achieve a time average substantially equal utilization of each drive current system. The first, second and third period of time may be substantially equal or dissimilar and they may be determined based on the intensity of each corresponding hotspot associated with each corresponding feed point, for example.

Figure 5:
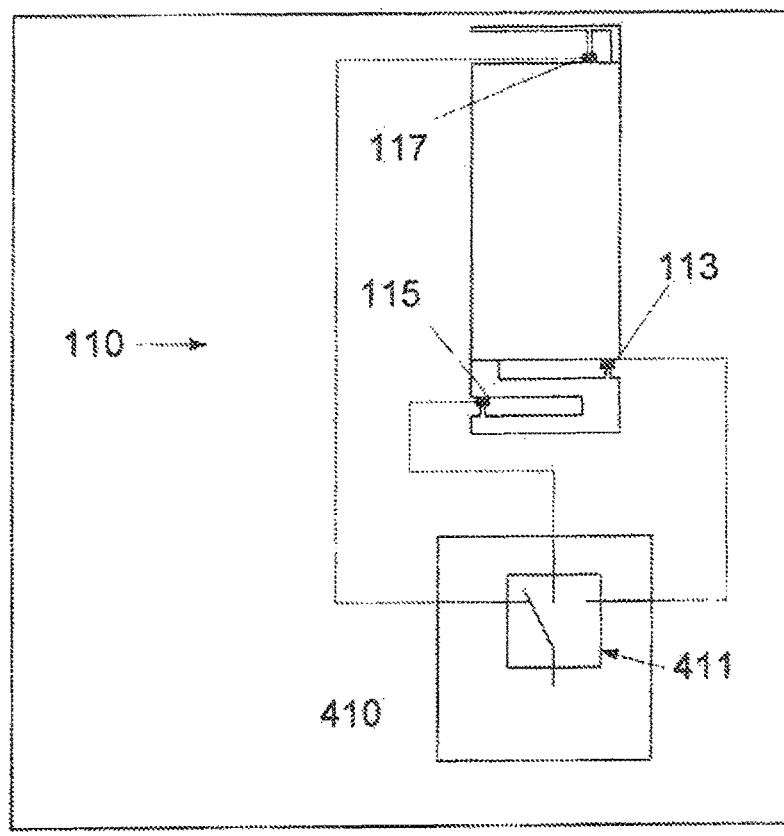
FIG. 5 illustrates a schematic view of the antenna system of FIG. 2 connected to a drive current system according to another embodiment of the present invention.

FIG. 5 illustrates schematically another example drive current system 410. The drive current system 410 comprises one drive current generation system for generating a single drive current and selectively provides the drive current to one of the three feed points 113, 115 or 117 at a time. The drive current system 410 includes a controllable switching system 411 for selectively providing drive current to the feed points 113, 115, and 117. The drive current system includes a controller (not illustrated) configured to control the switching of the switching system 411 of the one drive current between the three feed points 113, 115, and 117.

Figure 6:
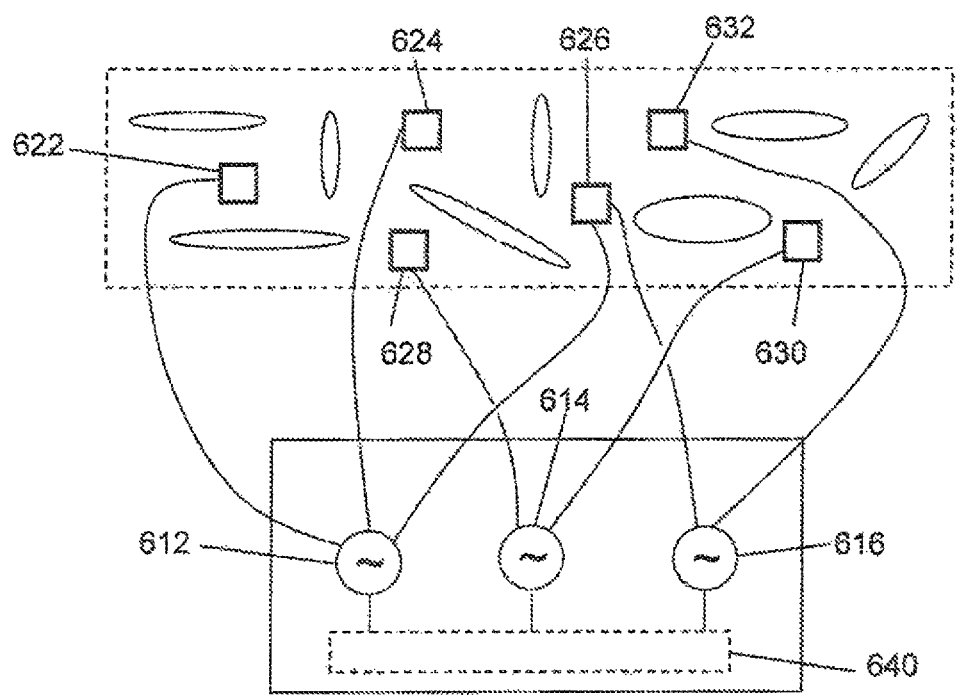
FIG. 6 illustrates a schematic view of an antenna system in accordance with an embodiment of the present invention.

FIG. 6 schematically illustrates another antenna system in accordance with the present invention. The antenna system as illustrated comprises six feed points 622, 624, 626, 628, 630, and 632, each operatively coupled to one or more antenna components, such as common or different radiating antenna bodies. Different feed points may drive the same antenna component, different antenna components, or both. Application of current to different combinations of one or more feed points corresponds to different radiation patterns of the antenna system. The antenna system is operatively coupled to plural current sources 612, 614, 616, each current source operatively coupled to a different set of feed points. For example, current source 612 is configured for driving feed points 622, 624 and 626; current source 614 is configured for driving feed points 628 and 630; and current source 616 is configured for driving feed points 626 and 632. The current sources 612, 614, 616 may be separate current sources, which in some embodiments may be operated concurrently, or they may correspond to a common current source which is switchable to operate at different times as current sources 612, 614, and 616, respectively. A drive current system 640 may be provided for operation of the current sources 612, 614, 616. In some embodiments, each of current sources 612, 614, and 616 is operated during a different time interval, thereby resulting in different radiation patterns of the antenna system over time. The overall radiation pattern, for example taken over time, is a combination of these different radiation patterns. In some embodiments, each of the current sources 612, 614, and 616 may be operated during substantially non-overlapping or disjoint time intervals. In other embodiments, at least two of the current sources 612, 614, and 616 may be operated during substantially overlapping time intervals.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

What we claim is:

1. A method for providing drive current to a single antenna for a wireless device, the single antenna having at least two feed points, including a first feed point coupled to a first section of the antenna, and a second feed point coupled to a second section of the antenna, the method comprising:
   a. receiving a control parameter indicating a maximum Specific Absorption of Radiation (SAR);
   b. providing a first drive current to the first section at the first feed point for a first predetermined time so that a first radiation pattern configured for wireless communication is generated;
   c. providing a second drive current to the second section at the second feed point for a second predetermined time so that a second radiation pattern configured for wireless communication is generated, wherein the second radiation pattern is at least in part different from the first radiation pattern; and
   d. repeating steps b) and c) until occurrence of a predetermined event,
   wherein an overall radiation pattern configured for wireless communication is generated for providing transmission signals on a single wireless network, the overall radiation pattern being at least in part a combination of the first radiation pattern and the second radiation pattern, and
   wherein the first radiation pattern and the second radiation pattern are controlled to limit the overall radiation pattern to the maximum SAR, and
   wherein a controller is configured to individually control the first and second drive currents by magnitudes to produce the first and second radiation patterns, respectively, for generating the overall radiation pattern as a time-averaged radiation pattern to limit the maximum SAR.

2. The method according to claim 1, wherein the first predetermined time is non-overlapping with the second predetermined time.

3. The method according to claim 1, wherein the first predetermined time partially overlaps with the second predetermined time.

4. The method according to claim 1, wherein the first radiation pattern corresponds to a first hotspot and the second radiation pattern corresponds to a second hotspot located at least partially differently from the first hotspot.

5. The method according to claim 1, wherein the first feed point is operatively coupled to a different radiating antenna body than the second feed point.

6. The method according to claim 1, further comprising providing N different drive currents during N corresponding time intervals, thereby generating N different radiation patterns, the overall radiation pattern being a combination of the N different radiation patterns and irradiation due to the overall radiation pattern being an average of irradiations due to the N different radiation patterns, thereby spreading irradiation over the N different radiation patterns.

7. The method according to claim 1, the method further comprising switching a master drive current to supply the first feed point for the first predetermined time and switching the master drive current to supply the second feed point for the second predetermined time, thereby selectively providing the first drive current and the second drive current.

8. The method according to claim 1, the method further comprising:
   d. detecting one or more position attributes selected from the group consisting of: proximity of the wireless device to a user, position of the wireless device, and orientation of the wireless device;
   e. adjusting the overall radiation pattern based on the one or more position attributes; and
   f. providing the first drive current for a first predetermined time.

9. The method according to claim 1, further comprising at least one of periodically, intermittently and randomly varying the first drive current and the second drive current over time to vary the first and second radiation patterns over time and generate the overall radiation pattern.

10. The method according to claim 1, wherein the predetermined event includes activation of an outgoing transmission.

11. The method according to claim 1, wherein the predetermined event includes completion of transmission of a predetermined number of voice or data packets.

12. The method according to claim 1, wherein the predetermined event includes expiry of a predetermined amount of time since a last switch between the first drive current and the second drive current.

13. The method according to claim 1, wherein the predetermined event includes provision of a predetermined amount of the first drive current or the second drive current since a last switch between the first drive current and the second drive current.

14. The method according to claim 1, wherein the predetermined event includes radiation of a predetermined amount of energy due to the first drive current or the second drive current since a last switch between the first drive current and the second drive current.

15. The method according to claim 1, wherein the predetermined event includes occurrence of a predetermined sensor reading.

16. The method according to claim 1, further comprising varying a phase of the first drive current with respect to the second drive current.

17. The method according to claim 16, wherein the first drive current is varied 180 degrees out of phase with respect to the second drive current.

18. The method according to claim 1, further comprising varying a magnitude of the first drive current with respect to the second drive current.

19. The method according to claim 1, further comprising providing the first drive current and the second drive current with substantially the same frequency over a predetermined time interval.

20. The method according to claim 1, wherein the single antenna is a monopole antenna, an inverted F antenna or a planar inverted F antenna.

21. The method according to claim 1, wherein the single wireless network is selected from a group consisting of: wireless LAN; WiMAX; Global System for Mobile Communication (GSM); Universal Mobile Telecommunications System (UMTS); Code Division Multiple Access (CDMA); and International Mobile Telecommunications-2000(IMT-2000).

22. A method for providing drive current to a single antenna for a wireless device, the single antenna having at least two feed points, including a first feed point coupled to a first section of the antenna, and a second feed point coupled to a second section of the antenna, the method comprising:
   a. receiving a control parameter indicating a maximum SAR;
   b. providing a first drive current to the first section at the first feed point for a first predetermined time so that a first radiation pattern configured for wireless communication is generated;
   c. providing a second drive current to the second section at the second feed point for a second predetermined time so that a second radiation pattern configured for wireless communication is generated, wherein the second radiation. pattern is at least in part different from the first radiation pattern; and.
   d. repeating steps b) and c) until occurrence of a predetermined event,
   wherein an overall radiation pattern configured for wireless communication is generated for providing transmission signals on a single wireless network, the overall radiation pattern being at least in part a combination of the first radiation pattern and the second radiation pattern,
   wherein the first radiation pattern and the second radiation pattern are controlled to limit the overall radiation pattern to the maximum SAR, and
   wherein at least one of a magnitude and a phase of the first drive current is varied with respect to the second drive current while the first drive current and the second drive current are provided with substantially the same frequency over a predetermined time interval, and
   wherein a controller is configured to individually control the first and second drive currents by magnitudes to produce the first and second radiation patterns, respectively, for generating the overall radiation pattern as a time-averaged radiation pattern to limit the maximum SAR.

* * * * *